United States Patent [19]

Rutan et al.

[11] Patent Number: 5,509,435
[45] Date of Patent: Apr. 23, 1996

[54] NON-LEAKING VALVE

[75] Inventors: Charles R. Rutan, Rosharon; Jack D. Sumrall, Pasadena; Anthony L. Alex, Houston, all of Tex.

[73] Assignee: Occidental Chemical Corporation, Niagara Falls, N.Y.

[21] Appl. No.: 345,955

[22] Filed: Nov. 25, 1994

[51] Int. Cl.$^6$ ................................................. F16K 31/50
[52] U.S. Cl. ............................ 137/15; 251/216; 251/900
[58] Field of Search .................................. 251/216, 339, 251/351, 900; 137/15

[56] References Cited

U.S. PATENT DOCUMENTS

| | | | |
|---|---|---|---|
| 257,983 | 5/1882 | Scofield | 251/216 |
| 261,671 | 7/1882 | Carney | 251/216 |
| 409,031 | 8/1889 | Forniraseo | 251/216 |
| 863,953 | 8/1907 | Tribbey | 251/216 |
| 955,531 | 4/1910 | Mueller | 251/216 |
| 1,293,218 | 2/1919 | Shannon et al. | 251/216 |
| 1,548,091 | 8/1925 | Lombardi | 251/216 |
| 2,496,030 | 1/1950 | Winey | 251/216 |
| 3,422,679 | 1/1969 | McGowan et al. | 251/351 |
| 4,986,502 | 1/1991 | Ceroke | 251/216 |

*Primary Examiner*—George L. Walton
*Attorney, Agent, or Firm*—Wayne A. Jones; Richard D. Fuerle

[57] ABSTRACT

Disclosed is a valve having (A) a valve body with an aperture therethrough, a threaded tap crossing the aperture and opening to only one side of the valve body, (B) a tap screw having a head of larger diameter adopted to screw into the threaded tap, where the tap screw has a hole therethrough which aligns with the aperture when the valve is in an opened position and which is at a substantially right angle to said aperture when the valve is in a closed position, and (C) an o-ring fitted under the head of the tap screw which is compressed between the head and the valve body when the valve is in an opened or closed position.

16 Claims, 1 Drawing Sheet

NON-LEAKING VALVE

BACKGROUND OF THE INVENTION

This invention relates to a non-leaking injection valve. In particular, it relates to a valve body having an aperture therethrough, a tap that crosses said aperture, a tap screw that screws into the tap, an o-ring under the head of the tap screw, and an aperture through the tap screw that is aligned with the aperture through the valve body when the o-ring is compressed.

When packing leaks occur on a large valve and the valve cannot be taken off line, the leak is repaired while pressurized liquids or gases are in the valve. This is accomplished by drilling part way into the stuffing box of the valve and threading the hole. An injection valve is screwed into the hole, a ball valve is screwed into the injection valve, and a blow out preventer is screwed into the ball valve. The stuffing box, is drilled into through the valves and the blow out preventer, and sealant is injected into the stuffing box.

The injection valves used for this purpose are off-the-shelf valves that have tap screws that go all the way through the valve. Fluids tend to leak around the threads of the valves, exposing workers and polluting the atmosphere.

SUMMARY OF THE INVENTION

We have discovered that an injection valve can be made which will not leak fluids even at pressures of 2000 psi or more. In the valve of this invention, the tap does not pass all the way through the valve so that only one interface between the tap screw and the valve needs to be sealed to prevent external leaks. Also, a hole through the tap screw is drilled only when an o-ring under the head of the tap screw is compressed. Thus, the valve is in an opened or closed position only when the o-ring is compressed. In this way, fluids are prevented from leaking to the outside of the valve.

DESCRIPTION OF THE PREFERRED EMBODIMENTS

Figure 1:
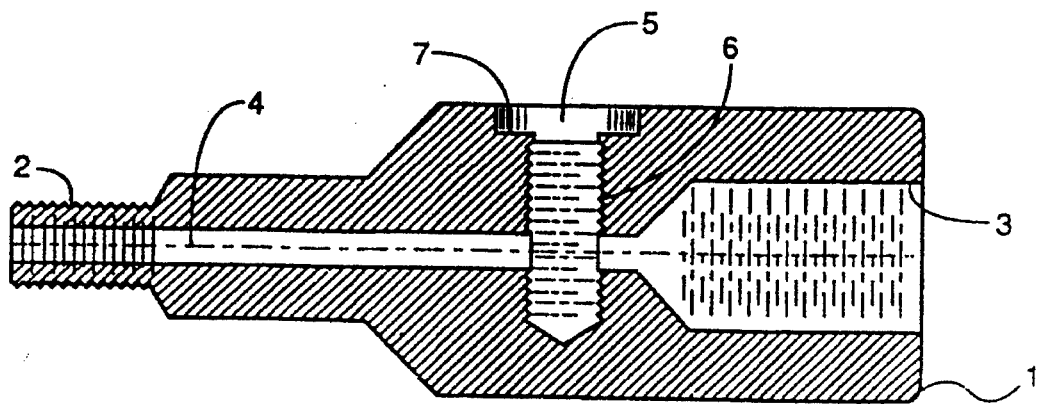
FIG. 1 is a side view in section of a valve body according to this invention.

In FIG. 1, an elongated valve body 1 is threaded externally 2 at one end and internally 3 at the other end and an aperture 4 passes from one end of the valve body 1 to the opposite end. A tap 5 having threads 6 and seat 7 extends into valve body 1 perpendicular to aperture 4. The center of tap 5 intersects the center of aperture 4 but tap 5 does not extend all the way through valve body 1.

Figure 2:
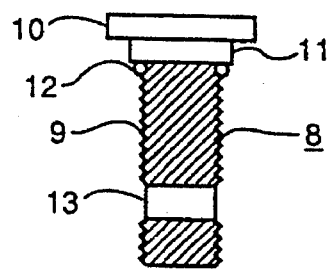
FIG. 2 is a side view partially in section illustrating a cap screw suitable for screwing into the tap of the valve body shown in FIG. 1.

In FIG. 2, tap screw 8 has threads 9 which can cojoin with threads 6 of tap 5 in FIG. 1. Tap screw 8 is of larger diameter than aperture 4 and, to ensure a good seal between tap screw 8 and valve body 1, preferably has a diameter about 2 to about 3 times greater than the diameter of aperture 4. Tap screw 8 has a head 10, of larger diameter than its shank, a portion of which can fit into seat 7 of tap 5 in FIG. 1. Head 10 can be hexagonal or slotted so that tap screw 8 can be turned. An o-ring 12 fits around the shank of cap screw 8 under head 10. Tap screw 8 is also provided with a hole 13 drilled therethrough, preferably of the same diameter as aperture 4, which aligns with aperture 4 when tap screw 8 is screwed into tap 5 and o-ring 13 is compressed against seat 7.

The valve of this invention can be manufactured by drilling and threading a tap as shown in FIG. 1 in a valve body such that the tap does not pass all the way through the valve body. A tap screw having an o-ring under its head, as shown in FIG. 2, is screwed into the tap until the o-ring is fully compressed. An aperture 4, shown in FIG. 1, is drilled through the valve body and through the center of the tap screw. When the tap screw is loosened one quarter turn the valve is closed and the o-ring remains compressed. Alternatively, the valve can be made by screwing the tap screw into the tap until the o-ring is fully compressed, loosening the tap screw one quarter turn, and then drilling aperture 4 through the valve body and the center of the tap screw. When the tap screw is then tightened one quarter turn, the valve is closed and the o-ring is compressed even more. The top of the tap screw and the valve body around it can be provided with an arrow and markings, respectively, to indicate when the valve is opened or closed.

We claim:

1. A valve comprising
   (A) a valve body having an aperture passing therethrough and a threaded tap of larger diameter than said aperture crossing said aperture at a substantially right angle and opening to only one side of said valve body;
   (B) a tap screw having a head of larger diameter than its shank, substantially fully inserted into said threaded tap in substantially sealing engagement therewith, said tap screw having a circular hole therethrough of the same diameter as said aperture which aligns with said aperture when said valve is in an opened position and which is at a substantially right angle to said aperture when said tap screw is turned 90° to place said valve in a closed position; and
   (C) an o-ring around said tap screw under said head which is compressed between said head and said valve body when said tap screw is in said opened position and when said tap screw is in said closed position.

2. A valve according to claim 1 wherein said tap screw has a hexagonal head.

3. A valve according to claim 1 wherein said valve body is threaded at each end over said aperture.

4. A valve according to claim 3 wherein said valve body is internally threaded at one end and externally threaded at the other end.

5. A valve according to claim 1 wherein said threaded tap is perpendicular to said aperture.

6. A valve according to claim 1 wherein said valve body is elongated in the direction of said aperture.

7. A valve according to claim 1 wherein the diameter of said threaded tap is about 2 to about 3 times larger than the diameter of said aperture.

8. A method of assembling a valve comprising
   (A) providing a first drilled opening in a valve body and threading a tap into said first drilled opening, where said first drilled opening does not extend all the way through said valve body;
   (B) screwing a threaded tap screw having an o-ring under its head into said tap in substantially sealing engagement therewith, compressing said o-ring between said head and said valve body when said tap screw is substantially fully inserted and when said tap screw is turned 90° from said substantially fully inserted position; and (C) providing a second drilled opening at a substantially right angle to said first drilled opening, extending all the way through said valve body and all the way through said threaded tap screw when said threaded tap screw is substantially fully inserted, where said second drilled opening is of a smaller diameter than said threaded tap screw.

9. A valve according to claim 8 wherein said tap screw has a hexagonal head.

10. A valve according to claim 8 wherein said valve is threaded at each end around said second drilled opening.

11. A valve according to claim 10 wherein said valve body is internally threaded at one end and externally threaded at the other end.

12. A valve according to claim 8 wherein the diameter of said threaded tap is about 2 to about 3 times larger than the diameter of said second drilled opening.

13. A valve according to claim 8 wherein said second drilled opening is provided when said o-ring is fully compressed.

14. A valve according to claim 8 wherein said second drilled opening is provided after said o-ring has been fully compressed and said tap screw has been loosened one quarter turn.

15. A valve comprising
   (A) an elongated valve body having an aperture passing therethrough lengthwise, said aperture being of small diameter at one end and of larger diameter at the opposite end, where said valve body is externally threaded at the end having the small diameter aperture and internally threaded at the end having the larger diameter aperture;
   (B) a threaded tap having a diameter about 2 to about 3 times larger than said aperture, crossing the center of said aperture at a 90-degree angle, and opening to only one side of said valve body;
   (C) a tap screw having a head of larger diameter than its shank, substantially fully inserted into said threaded tap in substantially sealing engagement therewith;
   (D) a circular hole through said tap screw of the same diameter as said aperture which aligns with said aperture when said valve is in an opened position and which is 90° to said aperture when said tap screw is turned 90° from said aligned position to place said valve in a closed position; and
   (E) an o-ring around said tap screw under said head which is compressed between said head and said valve body when said valve is in said opened position and when said valve is in said closed position.

16. A valve according to claim 15 including a seat in said valve body, around said threaded tap, of larger diameter than said head.

* * * * *